UNITED STATES PATENT OFFICE.

CHARLES WEYGANG, OF ROMSEY, ENGLAND.

MANUFACTURE OF SAPONACEOUS PRODUCTS FROM PETROLEUM.

SPECIFICATION forming part of Letters Patent No. 575,189, dated January 12, 1897.

Application filed December 28, 1894. Serial No. 533,211. (No specimens.) Patented in England February 12, 1894, No. 3,025; and December 10, 1894, No. 23,995; in Belgium December 10, 1894, No. 113,137; in France December 10, 1894, No. 243,535; in Germany December 11, 1894, No. 89,145; in Cape of Good Hope January 23, 1895, No. 6/224; in Transvaal January 25, 1895, No. 790; in Italy January 29, 1895, LXXIV, 319; in Victoria February 7, 1895, No. 11,998; in New South Wales February 9, 1895, No. 5,603; in South Australia February 11, 1895, No. 2,865; in Spain March 4, 1895, No. 16,867; in India April 2, 1895, No. 32; in Hungary July 11, 1895, No. 3,196; in Austria September 16, 1895, 45/3,310; in Canada November 13, 1895, No. 50,571, and in Russia June 30, 1896, No. 15,562.

*To all whom it may concern:*

Be it known that I, CHARLES WEYGANG, a citizen of England, residing at Edney's, West Wellow, Romsey, in the county of Hants, England, have invented a certain new and useful Treatment of Petroleum for the Manufacture of a Saponaceous Product, (for which I have obtained Letters Patent in Great Britain, dated February 12, 1894, No. 3,025, and December 10, 1894, No. 23,995; in France, dated December 10, 1894, No. 243,535; in Belgium, dated December 10, 1894, No. 113,137; in Germany, dated December 11, 1894, No. 89,145; in Victoria, dated February 7, 1895, No. 11,998; in New South Wales, dated February 9, 1895, No. 5,603; in South Australia, dated February 11, 1895, No. 2,865; in India, dated April 2, 1895, No. 32; in Cape of Good Hope, dated January 23, 1895, No. 6/224; in Canada, dated November 13, 1895, No. 50,571; in Transvaal, dated January 25, 1895, No. 790; in Spain, dated March 4, 1895, No. 16,867; in Austria, dated September 16, 1895, No. 45/3,310; in Hungary, dated July 11, 1895, No. 3,196; in Italy, dated January 29, 1895, Vol. LXXIV, 319, and in Russia, dated June 30, 1896, No. 15,562,) of which the following is a specification.

This invention relates to the manufacture of a saponaceous liquid which contains a resin and resin-soap dissolved in petroleum and which readily forms, when mixed with cold water, a perfect emulsion without any separation of the petroleum from the other constituents. For manufacture of the saponaceous liquid I dissolve resin in warm petroleum and add alkali, such as strong soda-lye, in small quantities, with continuous energetic stirring, until about half the resin is saponified. Partial saponification is preferably effected in the first instance with about one-third of the lye at a temperature of about 160° Fahrenheit, when impurities in the resin or in the soda-lye become precipitated. After settlement the supernatant clear liquid is drawn off and the saponification is proceeded with in the cold until it is found that there is some precipitate which does not become dissolved on agitation, showing that more than enough lye has been added.

Instead of dissolving all the resin in the petroleum and then treating the solution with alkali, about half of the resin may in the first instance be dissolved in the petroleum, and the other half, after being saponified by the alkali, may be added to the warm solution.

The saponaceous liquid, manufactured as above set forth, when mixed with water is a valuable insecticide, especially applicable to vines, hops, and other plants. The liquid also may be used in the manufacture of soap to effect the complete incorporation of larger or smaller quantities of petroleum with the soap; also when the liquid is treated with siccatives, such as sulphate of zinc, it forms an excellent vehicle for paints and may be used with advantage in the preparation of varnishes.

The proportions of the ingredients are somewhat varied according to the purposes to which the product is to be applied.

For a product suitable for use as an insecticide or in the manufacture of soap about sixteen parts by weight of resin are dissolved in one hundred parts of petroleum, and about 1.3 parts of canister-soda (dry weight) is used for saponifying, as described.

For a product suitable for use as a vehicle for paint or varnish about forty parts of resin are dissolved in one hundred parts of petroleum, about 3.5 parts of canister-soda (dry weight) being used for saponifying. With the liquid thus produced the siccative is mixed by stirring till no more is taken up. When zinc sulfate is employed, about fourteen parts are required.

Having thus described the nature of this invention and the best means I know of carrying the same into practical effect, I claim—

The herein-described process for the production of a saponaceous liquid, which consists in dissolving resin in warm petroleum, treating the solution with alkali in small quantities under continuous energetic stirring until partial saponification is effected and the impurities in the resin and lye are precipitated, then settling and drawing off the supernatant clear liquid, and then proceeding with saponification in the cold until there is some precipitate that does not dissolve on agitation, and finally pouring off the saponaceous liquid, substantially as described.

In testimony whereof I have signed my name to this specification, in the presence of two subscribing witnesses, this 11th day of December, A. D. 1894.

CHARLES WEYGANG.

Witnesses:
   OLIVER IMRAY,
   JNO. P. M. MILLARD.